US012801299B2

(12) United States Patent

Xu et al.

(10) Patent No.: US 12,801,299 B2

(45) Date of Patent: Nov. 17, 2026

(54) PHYSICAL ADDRESS MAPPING METHOD AND COMPONENT, AND DATA PROCESSING METHOD AND COMPONENT

(71) Applicant: DapuStor Corporation, Shenzhen (CN)

(72) Inventors: Shimeng Xu, Shenzhen (CN); Hui Zhou, Shenzhen (CN); Xiang Chen, Shenzhen (CN); Ying Yang, Shenzhen (CN); Xueming Cao, Shenzhen (CN); Yuanpeng Ma, Shenzhen (CN); Zhongbing Ji, Shenzhen (CN)

(73) Assignee: DapuStor Corporation, Shenzhen (CN)

( * ) Notice: Subject to any disclaimer, the term of this patent is extended or adjusted under 35 U.S.C. 154(b) by 0 days.

(21) Appl. No.: 19/179,164

(22) Filed: Apr. 15, 2025

(65) Prior Publication Data

US 2025/0244895 A1 Jul. 31, 2025

Related U.S. Application Data

(63) Continuation of application No. PCT/CN2023/085317, filed on Mar. 31, 2023.

(30) Foreign Application Priority Data

Dec. 8, 2022 (CN) ......................... 202211572911.2

(51) Int. Cl.
*G06F 3/06* (2006.01)

(52) U.S. Cl.
CPC .......... *G06F 3/0638* (2013.01); *G06F 3/0604* (2013.01); *G06F 3/0676* (2013.01)

(58) Field of Classification Search
CPC ..... G06F 3/0638; G06F 3/0604; G06F 3/0676
See application file for complete search history.

(56) References Cited

U.S. PATENT DOCUMENTS

| | | | | |
|---|---|---|---|---|
| 11,989,127 | B2 * | 5/2024 | Benisty | G06F 12/0246 |
| 2010/0268870 | A1 | 10/2010 | Kwon et al. | |
| 2017/0300246 | A1 * | 10/2017 | Michaeli | G06F 3/0688 |
| 2018/0089076 | A1 * | 3/2018 | Li | G06F 3/0665 |

(Continued)

FOREIGN PATENT DOCUMENTS

| | | | |
|---|---|---|---|
| CN | 108153681 | A | 6/2018 |
| CN | 108255742 | A | 7/2018 |

(Continued)

OTHER PUBLICATIONS

International Search Report and Written Opinion in related PCT Application No. PCT/CN2023/085317 dated Jul. 14, 2023 (12 pages).

*Primary Examiner* — Mark A Giardino, Jr.

(74) *Attorney, Agent, or Firm* — Bayes PLLC

(57) ABSTRACT

The present application provides a physical address mapping method and component, and a data processing method and component. The physical address mapping method includes: obtaining a target total capacity of a target hard disk; determining a Physical Media Address (PMA) expansion length if an existing PMA length does not meet a physical addressing range of target total capacity; and obtaining an available PMA length that meets the physical addressing range according to the PMA expansion length and the existing PMA length.

14 Claims, 7 Drawing Sheets

(56) References Cited

U.S. PATENT DOCUMENTS

| | | | |
|---|---|---|---|
| 2018/0101477 A1 | 4/2018 | Kan et al. | |
| 2022/0050784 A1* | 2/2022 | Das Purkayastha | G06F 12/0882 |
| 2024/0020240 A1* | 1/2024 | Chen | G06F 12/0238 |

FOREIGN PATENT DOCUMENTS

| | | | |
|---|---|---|---|
| CN | 109144897 | A | 1/2019 |
| CN | 113555057 | A | 10/2021 |
| CN | 114077555 | A | 2/2022 |
| CN | 115328819 | A | 11/2022 |
| CN | 115756299 | A | 3/2023 |

* cited by examiner

PHYSICAL ADDRESS MAPPING METHOD AND COMPONENT, AND DATA PROCESSING METHOD AND COMPONENT

CROSS-REFERENCE TO RELATED APPLICATIONS

The present application is a continuation of International Application No. PCT/CN2023/085317, filed on Mar. 31, 2023, which claims the benefit of priority to Chinese Patent Application No. 202211572911.2, filed on Dec. 8, 2022. The entire contents of each of the above-referenced applications are expressly incorporated herein by reference in their entirety.

TECHNICAL FIELD

The present application relates to the field of computer technology, in particular to a physical address mapping method and component, and a data processing method and component.

BACKGROUND

As the generation speed and amount of user data increase day by day, the amount of data to be stored also increases sharply. The 16 terabyte (TB) and 32 TB large-capacity storage hard disks have also emerged at the right moment, and the required memory size has been expanded to 16 GB and 32 GB accordingly. In this case, the Physical Media Address (PMA) needs to be able to access a larger physical storage space. However, the existing 32-bit PMAs only meet the need of physical addressing of hard disks with a capacity of 8 TB and below. That is, the existing 32-bit PMAs cannot cover the physical addressing range of hard disks with a capacity larger than 8 TB. For example, for a 16 TB hard disk, the 32-bit PMA cannot complete the physical addressing. The PMA expandability of the current storage hard disk is poor, making it impossible to flexibly meet the constantly expanding physical storage space.

Therefore, how to expand the physical addressing range of PMAs to improve expandability is a problem that needs to be solved by those skilled in the art.

SUMMARY

In view of this, an object of the present application is to provide a physical address mapping method and component, as well as a data processing method and component, for expanding the physical addressing range of PMAs and improving the expandability of PMAs. The specific solution is as follows.

In a first aspect, the present application provides a physical address mapping method, including: obtaining a target total capacity of a target hard disk; determining a PMA expansion length if an existing PMA length does not meet a physical addressing range of target total capacity; and obtaining an available PMA length that meets the physical addressing range according to the PMA expansion length and the existing PMA length.

In some embodiments, determining the PMA expansion length includes: determining a maximum total capacity that the existing PMA length meets; and determining the PMA expansion length as X if the target total capacity is $2^X$ times the maximum total capacity, where X is a positive integer.

In some embodiments, after obtaining an available PMA length that meets the physical addressing range according to the PMA expansion length and the existing PMA length, the method further includes: adjusting the available PMA length to obtain an optional PMA length; calculating a first number of PMAs and a first remaining length included in a cache line according to an available length of cache line of the target hard disk and the available PMA length; calculating a second number of PMAs and a second remaining length included in a single cache line according to the length of the cache line and the optional PMA length; and using the optional PMA length as an available PMA length that meets the physical addressing range if the first remaining length is greater than the second remaining length.

In a second aspect, the present application provides a data processing method, including: receiving data read and write operations sent by a host to which the target hard disk belongs; and performing physical addressing in the target hard disk for the available PMA length obtained according to any of the above methods, performing the data read and write operations, and updating an L2P table in a memory of the host.

In some embodiments, performing physical addressing in the target hard disk for the available PMA length obtained according to any of the above methods includes: building a cache line based on the available PMA length and performing physical addressing in the target hard disk based on the cache line.

In some embodiments, building a cache line based on the available PMA length includes:

- determining the PMAs of a target value included in the cache line according to the length of the cache line and the available PMA length; and sequentially arranging the PMAs of the target value having the available PMA length to build the cache line; or
- determining the PMAs of the target value included in the cache line according to the length of the cache line and the available PMA length, and calculating a difference D between available PMA length and 32-bit length; and sequentially arranging the first 32 bits of the PMAs of the target value, and arranging the last D bits of the PMAs of the target value from the tail of the cache line to build the cache line.

In some embodiments, the method further includes: using a mutex when updating the L2P table to ensure that only a single process accesses the L2P table at a time.

In some embodiments, the method further includes: moving the updated data corresponding to any PMA to a memory area corresponding to a user process after all bits corresponding to the PMA in the L2P table are updated, so that the user process reads the updated data corresponding to the PMA from the memory area. In a third aspect, the present application provides a physical address mapping device, including: an obtaining module for obtaining a target total capacity of a target hard disk; a determining module for determining a PMA expansion length if an existing PMA length does not meet a physical addressing range of target total capacity; and an expansion module for obtaining an available PMA length that meets the physical addressing range according to the PMA expansion length and the existing PMA length.

In a fourth aspect, the present application provides a data processing device, including: a receiving module for receiving data read and write operations sent by a host to which the target hard disk belongs; and a data read and write module for performing physical addressing in the target hard disk for the available PMA length obtained according to any of the above methods, performing the data read and write operations, and updating an L2P table in a memory of the host.

In a fifth aspect, the present application provides an electronic device, including: a memory for storing a computer program; and a processor for executing the computer program to implement corresponding methods disclosed above.

In a sixth aspect, the present application provides a readable storage medium for storing a computer program, where the computer program, when executed by a processor, implements the corresponding methods disclosed above.

It can be seen from the above solution that the present application provides a physical address mapping method, including: obtaining a target total capacity of a target hard disk; determining a PMA expansion length if an existing PMA length does not meet a physical addressing range of target total capacity; and obtaining an available PMA length that meets the physical addressing range according to the PMA expansion length and the existing PMA length.

It can be seen that the present application adaptably expands the PMA length for a large-capacity hard disk, so that the available PMA length obtained by the expansion can meet the physical addressing range of the large-capacity hard disk. In some embodiments, after determining the target total capacity of the target hard disk, if the existing PMA length does not meet the physical addressing range of the current target hard disk capacity, then determine a PMA expansion length; according to the PMA expansion length and the existing PMA length, obtain an available PMA length that meets the physical addressing range of the current target hard disk capacity. Therefore, according to the solution provided in the present application, physical address mapping and addressing of hard disks with a capacity greater than 8 TB can be completed, thus expanding the physical addressing range of PMAs. Accordingly, on the basis of wide-range physical addressing, the data read and write efficiency of a hard disk can also be improved.

Accordingly, a physical address mapping component and a data processing method and component provided in the present application also have the above technical effect. The component is a device, an apparatus, or a readable storage medium.

BRIEF DESCRIPTION OF DRAWINGS

In order to more clearly illustrate the technical solutions of the present application, the accompanying drawings will be briefly introduced below. Obviously, the accompanying drawings described below are only embodiments of the present application. For those of ordinary skill in the art, without creative efforts, other drawings can also be obtained based on the provided drawings.

DETAILED DESCRIPTION

The technical solutions in the embodiments of the present application will be described in conjunction with the accompanying drawings. Obviously, the described embodiments are only partial embodiments of the present application, not all embodiments. Based on the embodiments in the present application, all other embodiments obtained by ordinary technicians in the art without creative efforts belong to the scope of protection of the present application.

At present, the 32-bit PMA only meets the need of physical addressing of hard disks with a capacity of 8 TB and below. That is, the existing 32-bit PMAs cannot cover the physical addressing range of hard disks with a capacity larger than 8TB. For example, for a 16 TB hard disk, the 32-bit PMA cannot complete the physical addressing. The PMA expandability of the current storage hard disk is poor, making it impossible to flexibly meet the constantly expanding physical storage space. For this purpose, the present application provides a physical address mapping method that can expand the physical addressing range of PMAs and is suitable for physical addressing of large-capacity hard disks.

Figure 1:
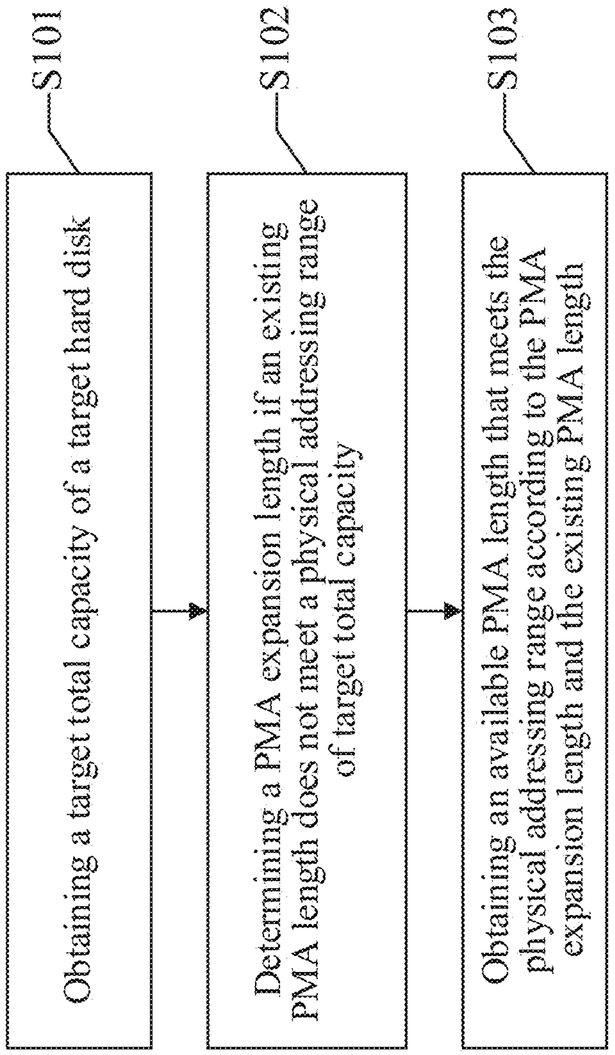
FIG. 1 is a flow chart of a physical address mapping method disclosed in the present application.

As illustrated in FIG. 1, an embodiment of the present application discloses a physical address mapping method, including:

- S101: obtaining a target total capacity of a target hard disk;
- S102: determining a PMA expansion length if an existing PMA length does not meet a physical addressing range of target total capacity; and
- S103: obtaining an available PMA length that meets the physical addressing range according to the PMA expansion length and the existing PMA length.

In some embodiments, determining a PMA expansion length includes: determining a maximum total capacity that the existing PMA length meets; determining the PMA expansion length as X if the target total capacity is $2^X$ times the maximum total capacity, where X is a positive integer. For example, the existing PMA length is 32 bits, which meets a maximum total capacity of 8 TB, while the target total capacity of the target hard disk is 16 TB. Therefore, the 32-bit PMA does not meet the physical addressing range of 16 TB. In this case, 16 TB is $2^1$ times 8 TB, so the value of X is 1 and 32 bits of PMAs are modified to 33 bits. That is, a single PMA is expanded from 32 bits to 33 bits. Accordingly, if the target total capacity of the target hard disk is 32 TB, the value of X is 2 since 32 TB is $2^2$ times that of 8 TB. That is, a single PMA is expanded from 32 bits to 34 bits to ensure that the PMA length can meet the requirements for a hard disk with a capacity of 32 TB. According to this logic, the value of PMA expansion length X can be determined by analogy for hard disks with a larger capacity. It can be seen that if the PMA length is increased by one bit, the addressable disk capacity can be doubled. Therefore, the maximum addressable disk capacity of a 33-bit PMA is 16 TB, the maximum addressable disk capacity of a 34-bit PMA is 32 TB, the maximum addressable disk capacity of a 35-bit PMA is 64 TB, and so on.

It should be noted that after the available PMA length for physical addressing meeting the target total capacity is obtained by expansion, it is possible to further judge the waste of resources for the available PMA length obtained through the current expansion. That is, it is possible to calculate the maximum value of PMAs included in a single cache line, thus determining the value of remaining bits that will be wasted. Assuming that the length of a single cache line is 64 bytes, so 64 bytes*8=512 bits. When the available PMA length is equal to 33 bits, 512 is divided by 33, so at most 15 complete PMAs can be obtained. In this case, there are 512−33*15=17 bits remaining in the single cache line. These 17 bits have to be left unused, resulting in a waste of resources. In this case, it can be considered to expand the available PMA length by one bit, and then calculate again according to the above principle. It can be seen that when the available PMA length is 34 bits, a 64-byte single cache line also includes at most 15 complete PMAs, but only 512−34*15=2 bits are wasted in the single cache line. It can be seen that although a 33-bit PMA can meet the physical addressing of a 16 TB hard disk, it will waste more resources compared with a 34-bit PMA. In this case, a 34-bit PMA may be preferentially selected for use by a 16 TB hard disk. Of course, a 34-bit PMA can be applied to 32 TB hard disks. Therefore, when a 34-bit PMA is applied to a 32 TB hard disk, it is not necessary to expand the PMA length.

In an embodiment, after obtaining an available PMA length that meets the physical addressing range, the method further includes: adjusting the available PMA length to obtain an optional PMA length; calculating a first number of PMAs and a first remaining length included in a cache line according to an available length of cache line of the target hard disk and the available PMA length; calculating a second number of PMAs and a second remaining length included in a single cache line according to the length of the cache line and the optional PMA length; and using the optional PMA length as an available PMA length that meets the physical addressing range if the first remaining length is greater than the second remaining length.

Here, adjusting the available PMA length to obtain an optional PMA length includes increasing the available PMA length by one to obtain an optional PMA length. The optional PMA length may be used as an available PMA length that meets the physical addressing range if the first number of PMAs is equal to the second number of PMAs and the first remaining length is greater than the second remaining length. In this way, for a current hard disk, it is possible to determine two available PMA lengths (for example, 34-bit PMA and 33-bit PMA determined for a 16 TB hard disk), both of which are suitable for physical addressing of the hard disk, but the quality of implementation solutions differs.

Here, the length of a single cache line may be 32 bytes, 64 bytes, or 128 bytes.

It should be noted that when expanding the capacity of a hard disk, hardware such as ce (chip enable information) and channels in mau of the hard disk may be expanded. The expansion principle is as follows: preferentially select the hardware expansion solution with the least modification to the hardware of the hard disk. Therefore, the capacity of the hard disk may be increased by expanding ce or by expanding other hardware structures. For the modification of an 8 TB hard disk based on the principle of "minimum hardware modification", the ce in the 8 TB hard disk may be expanded from 4 to 8, and other hardware structures may be improved accordingly to obtain a 16 TB hard disk.

It can be seen that this embodiment adaptably expands the PMA length for a large-capacity hard disk, so that the available PMA length obtained by the expansion can meet the physical addressing range of the large-capacity hard disk. In some embodiments, after determining the target total capacity of the target hard disk, if the existing PMA length does not meet the physical addressing range of the current target hard disk capacity, determine a PMA expansion length; according to the PMA expansion length and the existing PMA length, obtain an available PMA length that meets the physical addressing range of the current target hard disk capacity. Therefore, according to the solution provided in the present application, physical address mapping and addressing of hard disks with a capacity greater than 8 TB can be completed, thus expanding the physical addressing range of PMAs. Accordingly, on the basis of wide-range physical addressing, the data read and write efficiency of a hard disk can also be improved.

A data processing method provided by the present application is introduced as follows. The data processing method introduced below and the physical address mapping method described above can be cross-referenced.

Figure 3:
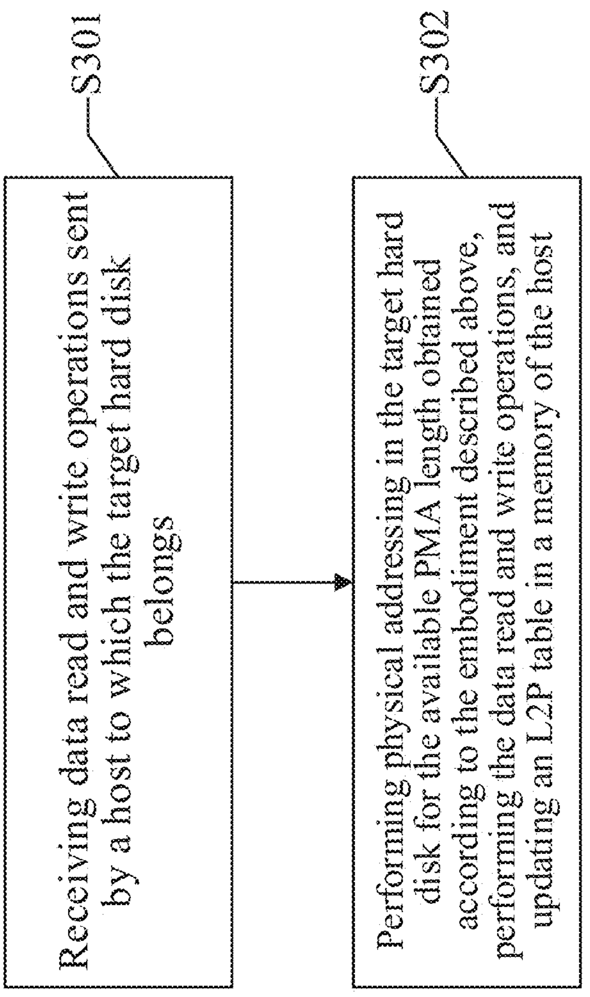
FIG. 3 is a flow chart of a data processing method disclosed in the present application.

As illustrated in FIG. 3, an embodiment of the present application discloses a data processing method, including:

- S301: receiving data read and write operations sent by a host to which the target hard disk belongs; and
- S302: performing physical addressing in the target hard disk for the available PMA length obtained according to the embodiment described above, performing the data read and write operations, and updating an L2P table in a memory of the host.

Generally, a PMA length and a single cache line length are set in the firmware of a hard disk. Therefore, after determining an available PMA length of a hard disk according to the present application, a physical addressing policy for the hard disk may be built accordingly and set in the firmware of the hard disk. It should be noted that a cache line area generally includes a plurality of cache lines. Therefore, when performing physical addressing in the target hard disk for the available PMA length obtained by the method according to the embodiment described above, it is necessary to build a cache line based on the available PMA length and perform physical addressing in the target hard disk based on the cache line.

In an embodiment, performing physical addressing in the target hard disk for the available PMA length obtained by the method according to the embodiment described above includes: building a cache line based on the available PMA length, and performing physical addressing in the target hard disk based on the cache line.

Figure 2:
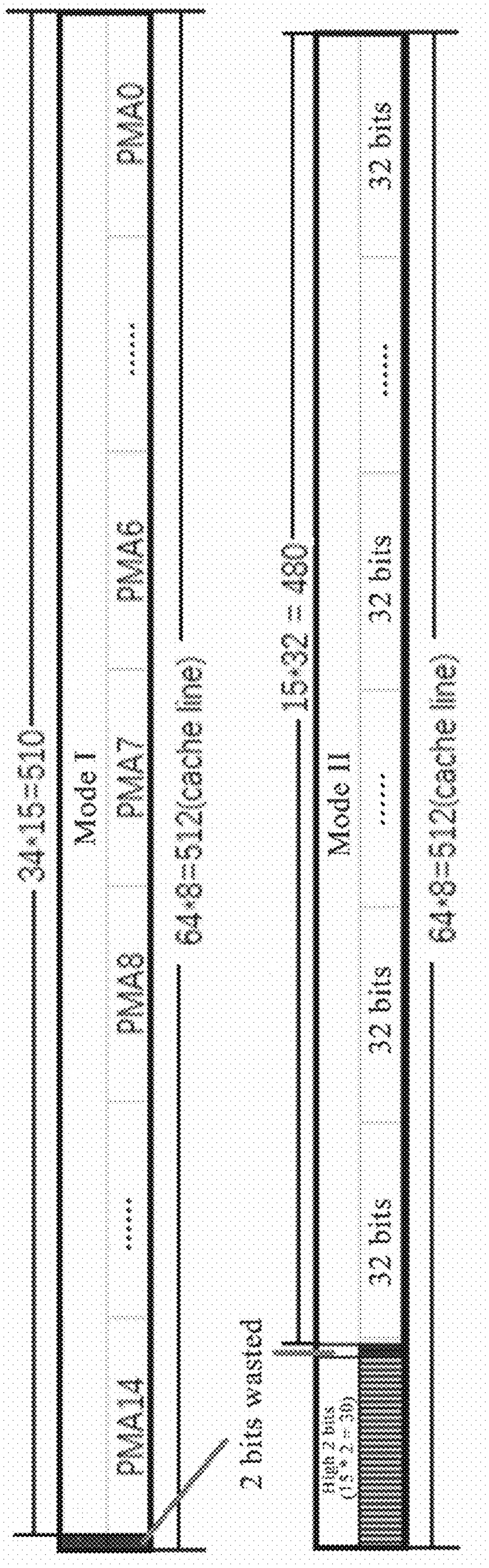
FIG. 2 is a schematic diagram of the layout of PMAs in one cache line disclosed in the present application.

It should be noted that since the hardware operation atomic size of a hard disk is 32 bits, although PMAs are 33 bits and 34 bits, data operations need to be performed in accordance with the 32-bit hardware operation atomic size. Therefore, for non-32-bit PMAs, there may be the following two arrangement modes in a single cache line. Referring to FIG. 2, when taking a 34-bit PMA and a 64-byte single cache line as an example, Mode I is as follows: sequentially arrange 15 34-bit PMAs in a single cache line, and leave the remaining 2 bits unused. Mode II is as follows: sequentially arrange the low 32 bits of 15 PMAs in a single cache line, arrange the high 2 bits of 15 PMAs from the tail of the cache line, and leave the remaining 2 bits unused. It is experimentally verified that the Input/Output Operations Per Second (IOPS) of Mode II reaches 1,768K, and the IOPS of Mode I reaches 1,620K. It can be seen that the read and write efficiency in Mode II is faster than that in Mode I. This is because when during the read and write operations according to the hardware operation atomic size, in Mode I, the number of bits needs to be calculated according to the 32-bit hardware operation atomic size every time when operating a PMA; in Mode II, each PMA is operated by first operating the first 32 bits and then operating the last 2 bits. It can be seen that the logic of operating each PMA in Mode II remains unchanged, but calculation is needed every time when operating the PMA in Mode I. Therefore, the read and write efficiency in Mode II is faster than that in Mode I.

In an embodiment, building a cache line based on the available PMA length includes: determining the PMAs of a target value included in the cache line according to the length of the cache line and the available PMA length; sequentially arranging the PMAs of the target value having the available PMA length to build the cache line; or determining the PMAs of the target value included in the cache line according to the length of the cache line and the available PMA length, and calculating a difference D between available PMA length and 32-bit length; sequentially arranging the first 32 bits of the PMAs of the target value, and arranging the last D bits of the PMAs of the target value from the tail of the cache line to build a single cache line.

In this embodiment, an L2P table is an address mapping table that records the correspondence between logical addresses and PMAs. When the host is powered off, the L2P table needs to be flushed to the hard disk for storage so that after the host is powered on, the read and write operations can be continued for the hard disk based on this table. However, since a large addressing space range leads to an increase in the address mapping relations that need to be recorded by the L2P table, the L2P table becomes very large. In order to quickly flush the L2P table to the hard disk in a short time, this embodiment enables the host to directly transmit a corresponding bus address of the L2P table in the memory to the hard disk controller, so that the hard disk controller can directly store the L2P table in the hard disk based on the bus address without transmitting a corresponding user address of the L2P table in the memory through an upper application. Therefore, when the host is powered off, the hard disk controller can obtain a corresponding bus address of the L2P table in the memory and store the L2P table in the target hard disk based on the bus address. Here, the host memory refers to the memory provided by the hard disk on the host.

Figure 4:
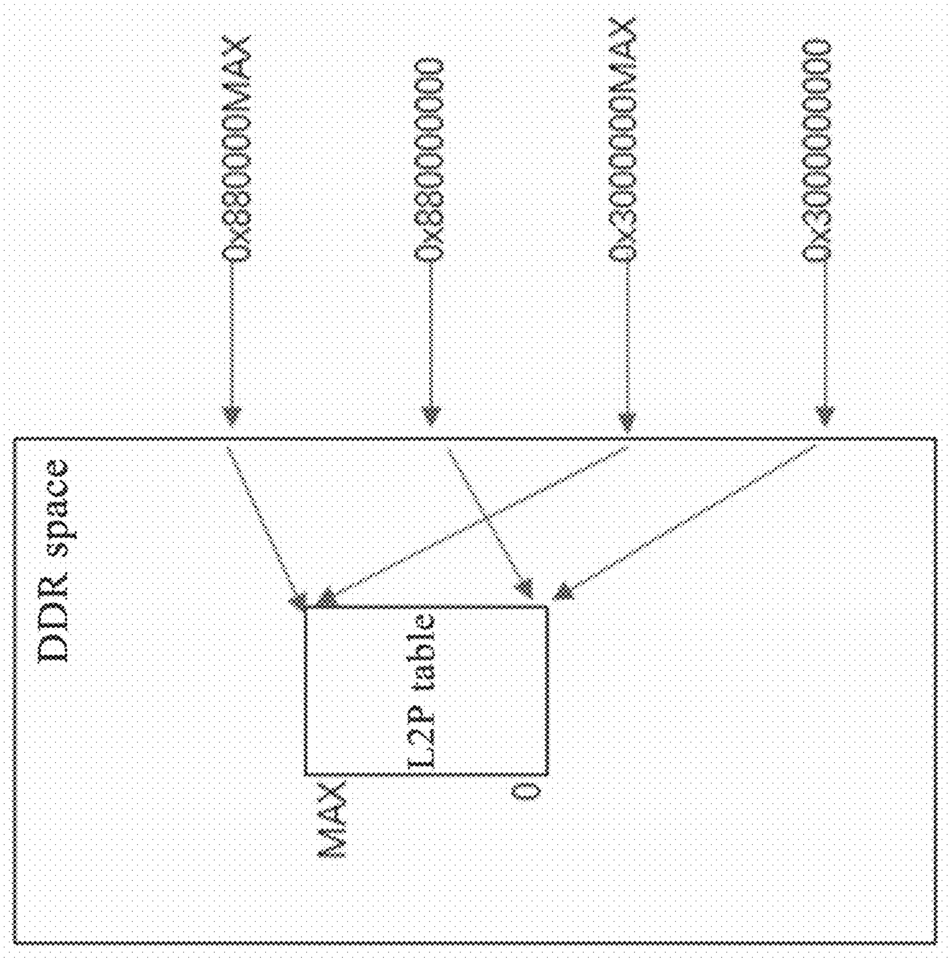
FIG. 4 is a schematic diagram of correspondence between user addresses and bus addresses in a memory disclosed in the present application.

As illustrated in FIG. 4, the corresponding user addresses of the L2P table in the host memory DDR are 0x880000000-0x880000Max, and the bus addresses corresponding to these user addresses are 0x3000000000-0x3000000Max. The upper application at the user layer can access the L2P table in the memory by using user addresses, and the lower hardware can access the L2P table in the memory by using bus addresses. When the host transmits the corresponding user addresses of the L2P table in the host memory to the hard disk controller through an upper application, the hard disk controller also needs to receive the addresses through the upper application and then convert the addresses into corresponding bus addresses before accessing the L2P table in the memory. It can be seen that the host directly transfers the corresponding bus addresses in the L2P table in the memory to the hard disk controller, enabling the hard disk controller to omit steps such as address conversion, thus improving the flushing efficiency for the L2P table.

In an embodiment, when the host is powered on, the L2P table in the target hard disk is read to the memory, thus updating the L2P table in the memory after data read and write operations are performed in the target hard disk. In order to avoid simultaneous access to the L2P table at multiple terminals and operation access error, in this embodiment, a mutex is used when updating the L2P table to ensure that only a single process accesses the L2P table at a time. Updating the L2P table is to modify the correspondence between logical addresses and PMAs in the L2P table, or to add a new correspondence between logical addresses and PMAs in the L2P table.

Since the hardware operation atomic size of the hard disk is 32 bits, the modification of all bits corresponding to a PMA in the L2P table is also carried out according to the hardware operation atomic size of 32 bits. When the PMA length is modified to any bits other than 32 bits, the following situation may occur: when one terminal has modified the first 32 bits of a PMA but has not modified the remaining bits of the PMA, the other terminal has started to access the PMA. Obviously, the data obtained by the other terminal accessing this PMA is wrong. In order to avoid this problem, this embodiment sets a dedicated memory area for the user process, and before all bits corresponding to a PMA are modified, the data on the bits corresponding to the PMA will not be transmitted to the dedicated memory area for the user process. That is, after all bits corresponding to a PMA are modified, the data on the bits corresponding to the PMA will be transmitted to the dedicated memory area for the user process. In this way, the user process can always access correct PMAs without accessing wrong PMAs. Therefore, it is required to move the updated data corresponding to any PMA to a memory area corresponding to a user process after all bits corresponding to the PMA in the L2P table are updated, so that the user process reads the updated data corresponding to the PMA from the memory area.

As described above, the L2P table is used to record the correspondence between logical addresses determined by the read and write operations and PMAs. In the read process, the PMA corresponding to the logical address corresponding to the current read operation may be obtained by querying the L2P table, a Nand space address in the hard disk (i.e. physical address of the hard disk) may be located according to this PMA, and the corresponding data from the Nand space address is read out. In the write process, a corresponding PMA is generated based on the logical address corresponding to the current read operation, a Nand space address (i.e. physical address) that can write data is allocated for this PMA, and the data is written in the Nand space address. After the write operation is completed, the correspondence between logical addresses and PMAs is recorded in the L2P table. It can be seen that a PMA is a bridge for the conversion between logical addresses and physical addresses. For more specific address conversion process and read and write process, please refer to existing related technologies. They will not be repeated in this embodiment.

It can be seen that this embodiment can complete the data read and write operations in the target hard disk by the expanded PMA, update the L2P table in the memory of the host, provide a fast disk write mode for the L2P table with a large amount of data, solve the conflict between non-32-bit PMAs and 32-bit hardware operating atoms, and improve the read and write efficiency.

The present application is further introduced below by taking an example of expanding a hard disk from 8 TB to 16 TB.

Firstly, the hardware structure of an 8 TB hard disk is modified based on the principle of "minimum hardware modification", in which ce is expanded from 4 to 8, and other hardware is improved accordingly to obtain a 16 TB hard disk. Accordingly, the 32-bit PMAs for the 8 TB hard disk is expanded to 33 bits to meet the Nand addressing requirements for a 16 TB hard disk.

Figure 5:
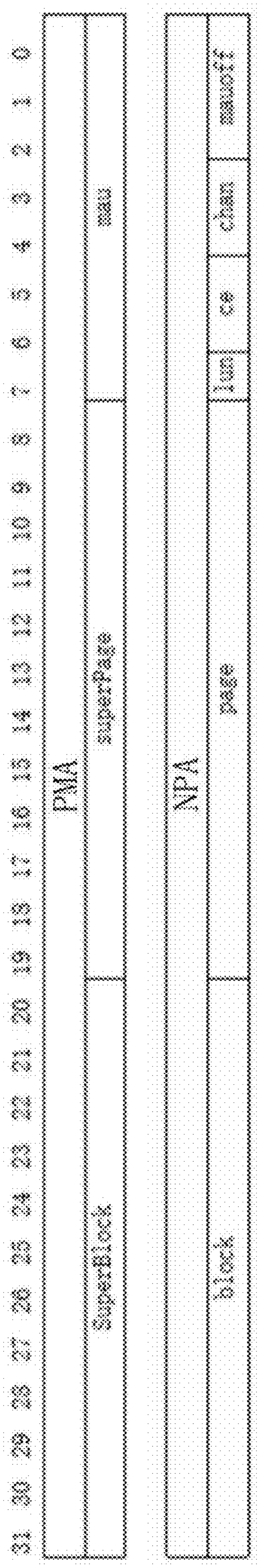
FIG. 5 is a schematic diagram of the correspondence between bit widths of PMA and NPA disclosed in the present application.

It should be noted that the physical structure of hard disk includes: channel, ce, lun, and so on. Referring to FIG. 5, a Nand Physical Address (NPA, physical address of a flash memory) in a hard disk includes block, page, logical unit (lun), ce, channel, and mauoff. For the relations between these hardware, please refer to existing related technologies. They will not be repeated here. However, it should be made clear the bit correspondence between NPAs and PMAs. The correspondence between a 32-bit PMA and an NPA is illustrated in FIG. 5. As illustrated in FIG. 5, the PMA includes SuperBlock, SuperPage and mau (the minimum read unit of a medium), and there is a correspondence between bit widths and NPAs.

Figure 6:
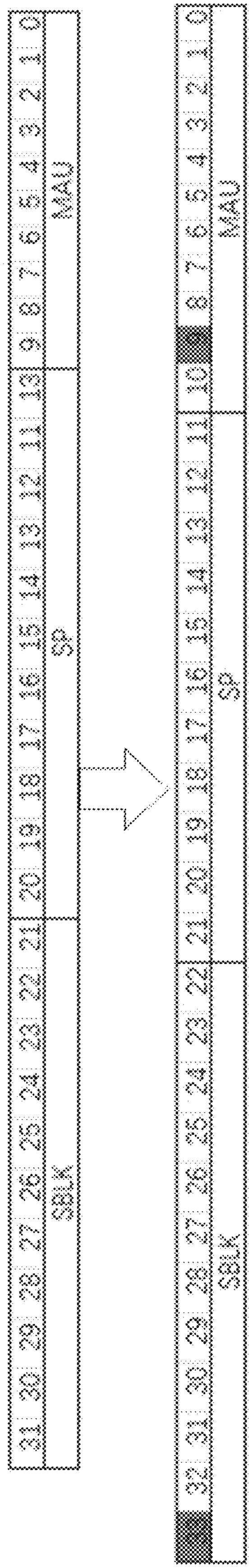
FIG. 6 is a schematic diagram of comparison before and after PMA expansion disclosed in the present application.

Referring to FIG. 6, when the PMA length is expanded in accordance with expansion of hardware ce, it can be realized by expanding the number of bits of mau. That is, when a 32-bit PMA is expanded to 33 bits, the mau in the PMA may be increased by one bit. As illustrated in FIG. 6, the number of bits occupied by an mau is expanded from 10 bits to 11 bits. Since a 16 TB disk preferentially selects a 34-bit PMA, a 34-bit PMA may be obtained by adding one bit to the tail of a 33-bit PMA. As illustrated in FIG. 6, among the bits 0-33 of an expanded PMA, the bit position of “9” is added according to the expansion of ce, and the bit position of “33” is added to provide a PMA with an optimal length for the 16 TB disk. Therefore, the bit position of “33” is a reserved bit for expansion and can be deleted.

Assuming that the length of a single cache line is 64 bytes, for a 33-bit PMA, a single cache line can accommodate up to 15 PMAs, and there will be 64*8−33*15=17 remaining bits. A 64-byte single cache line can accommodate up to 15 PMAs for a 34-bit PMA, and there will be only 64*8−33*15=2 remaining bits. Therefore, a 34-bit PMA can make better use of the cache line space compared with a 33-bit PMA, and is also suitable for 32 TB disks, facilitating the subsequent expansion of addressing range.

In a single cache line, a 34-bit PMA may have two layout modes, as illustrated in FIG. 2. As illustrated in FIG. 2, in a single cache line, 15 PMAs may be arranged in order from low bit to high bit of the PMA, and the remaining 2 bits at the end of the cache line are left unused. In some embodiments, the low 32 bits of the 15 PMAs may be sequentially arranged from low bit to high bit of the PMA, and the high 2 bits of the 15 PMAs may be arranged in the high 30 bits of the last U32 starting from the tail of the cache line. The low 2 bits of this U32 are left unused. That is, the high 30 bits of the last U32 are divided into 15 2bits for sequentially storing the high 2 bits of 15 PMAs. Here, one U32 includes 32 bits from bit 0 to bit 31.

According to the layout illustrated in any mode of FIG. 2, all PMAs are reasonably distributed in a single cache line of DDR, and only 2 bits are wasted per 64 bytes of DDR, thus ensuring that PMA access does not cross different cache lines. However, the bit distribution of PMAs illustrated in Mode II is more regular, and the low 32 bits are taken first and then the high 2 bits are taken according to a unified logic for each access to PMA. Therefore, the access efficiency in Mode II will be better than that in Mode I.

Since the expanded PMA has a larger addressing range, the L2P table recording the mapping relations between logical addresses and PMAs is larger. In order to realize the fast disk write of the L2P table in case of power failure of the device, 0x30 can be directly transmitted to the Nand controller to improve the efficiency of Nand controller in reading the L2P table, thus increasing the flushing speed of the L2P table. It is experimentally verified that the flushing time of a 16 TB L2P table is reduced from 8 seconds to 1 second.

Considering the limitation on 32-bit atomic operation size, it is also necessary to use a mutex so that only one terminal can read and write the L2P table at a specific time, so as to avoid data inconsistency between high 2 bits and low 32 bits of the same PMA, that is, to avoid data inconsistency caused by atomic operations.

Figure 7:
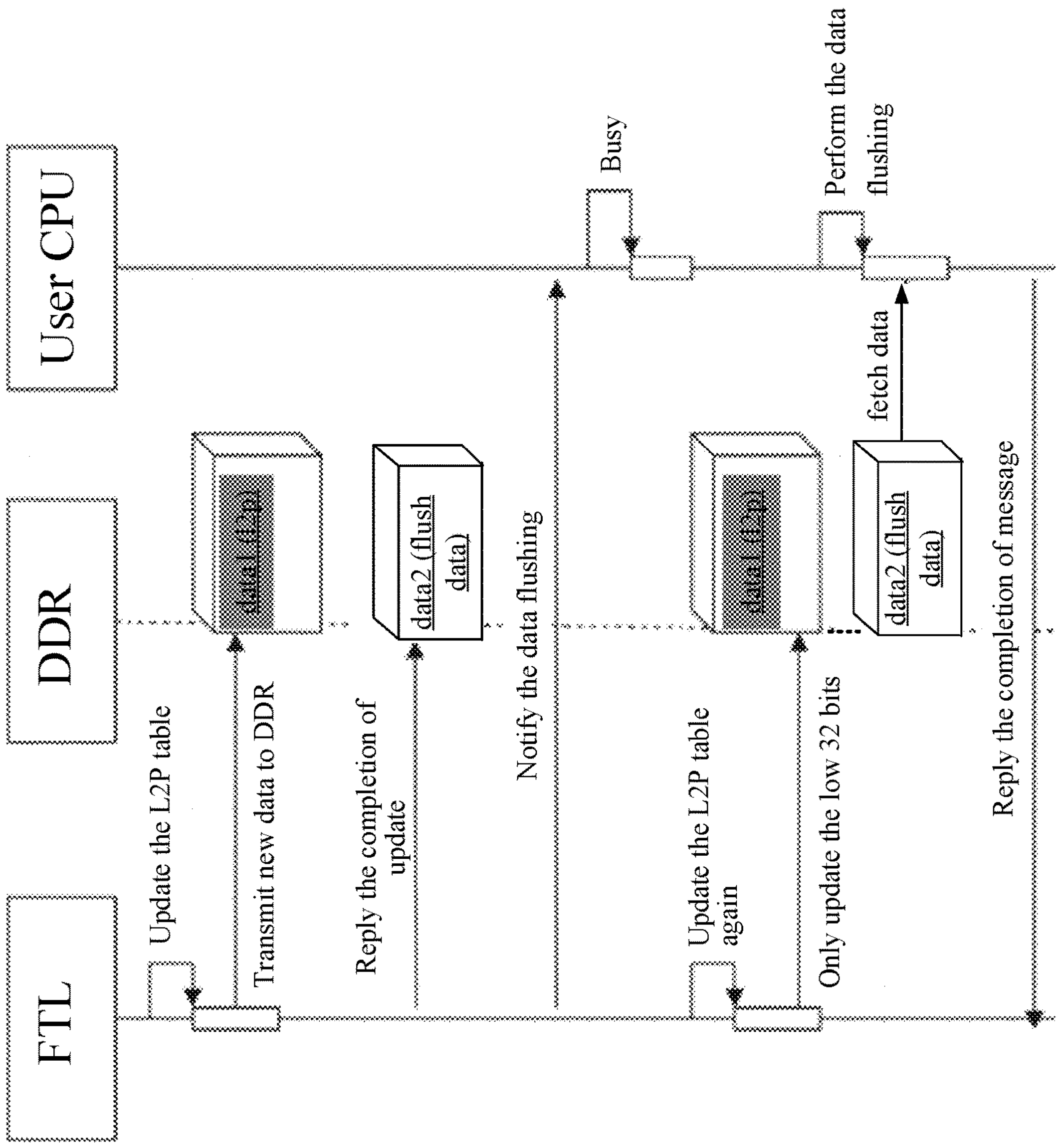
FIG. 7 is a schematic diagram of L2P table updating and flushing disclosed in the present application.

As illustrated in FIG. 7, after the FTL updates the L2P table, it will notify the user’s CPU to flush the data. If the user’s CPU is performing another task and does not immediately flush the data, and the FTL continues to update the L2P table, since a PMA has 34 bits and the FTL accesses the PMA according to an atomic operation size of 32 bits, the following situation may occur: the FTL has only updated the low 32 bits of a PMA and has not updated the high 2 bits of the PMA, and the user’s CPU has started to access the PMA. In this case, the low 32 bits obtained by the user’s CPU are the latest data, but the high 2 bits are old data that have not been updated, so dirty data will be generated.

In order to prevent the PMA with inconsistent high 2 bits and low 32 bits from being accessed, this embodiment sets a dedicated memory area for the user’s CPU. As illustrated in FIG. 7, the present application sets a dedicated memory area for the user’s CPU, and only after the FTL updates all bits of a PMA will the updated data of the PMA be stored in the dedicated memory area of the user’s CPU, so that the user’s CPU will not access the PMA with inconsistent high 2 bits and low 32 bits. As illustrated in FIG. 7, the FTL and the user’s CPU access different memory areas to realize the access to the same PMA from different terminals, thus avoiding data inconsistency caused by atomic operations.

It can be seen that this embodiment expands an 8 TB hard disk to a 16 TB hard disk, correspondingly expands the PMA length, reasonably sets the layout of PMAs in the cache line, and also solves the conflict between atomic operations and expanded PMA length as well as the fast disk write for the L2P table with a large amount of data. The PMAs provided in this embodiment meet the requirement for a larger addressing range. Updating the hard disk firmware according to this embodiment allows this embodiment to be applied to the hard disk read and write, improves the read and write bandwidth, and reduce the read and write delay.

A physical address mapping device provided by the present application is introduced as follows. The physical address mapping device introduced below and the physical address mapping method described above can be cross-referenced.

Figure 8:
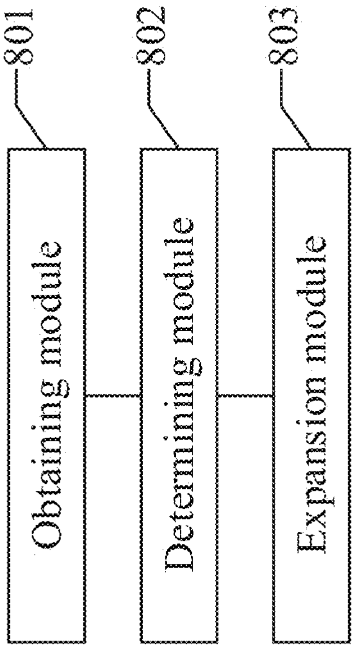
FIG. 8 is a schematic diagram of a physical address mapping device disclosed in the present application.

As illustrated in FIG. 8, an embodiment of the present application discloses a physical address mapping device, including: an obtaining module 801 for obtaining a target total capacity of a target hard disk; a determining module 802 for determining a PMA expansion length if an existing PMA length does not meet a physical addressing range of target total capacity; and an expansion module 803 for obtaining an available PMA length that meets the physical addressing range according to the PMA expansion length and the existing PMA length.

In an embodiment, the determining module is configured for: determining a maximum total capacity that the existing PMA length meets; and determining the PMA expansion length as X if the target total capacity is $2^X$ times the maximum total capacity, where X is a positive integer.

In an embodiment, the device further includes an optimization module configured for: adjusting the available PMA length to obtain an optional PMA length; calculating a first number of PMAs and a first remaining length included in a cache line according to an available length of cache line of the target hard disk and the available PMA length; calculating a second number of PMAs and a second remaining length included in a single cache line according to the length of the cache line and the optional PMA length; and using the optional PMA length as an available PMA length that meets the physical addressing range if the first remaining length is greater than the second remaining length.

Here, the optimization module is also configured for: increasing the available PMA length by one to obtain an optional PMA length; calculating a first number of PMAs and a first remaining length included in a single cache line according to an available length of the single cache line of the target hard disk and the available PMA length; calculating a second number of PMAs and a second remaining length included in a single cache line according to the length of the single cache line and the optional PMA length; and using the optional PMA length as an available PMA length that meets the physical addressing range if the first number of PMAs is equal to the second number of PMAs and the first remaining length is greater than the second remaining length.

In an embodiment, the device further includes: a building module for building a cache line based on the available PMA length.

Here, the building module building is configured for: determining the PMAs of a target value included in the cache line according to the length of the cache line and the available PMA length; sequentially arranging the PMAs of the target value having the available PMA length to build the cache line; or determining the PMAs of the target value included in the cache line according to the length of the cache line and the available PMA length, and calculating a difference D between available PMA length and 32-bit length; sequentially arranging the first 32 bits of the PMAs of the target value, and arranging the last D bits of the PMAs of the target value from the tail of the cache line to build a single cache line.

Here, for the more specific working processes of individual modules and units, please refer to the corresponding information disclosed in the above embodiments. They will not be repeated here.

It can be seen that this application provides a physical address mapping device that can expand the physical addressing range of PMAs and is suitable for physical addressing of large-capacity hard disks.

A data processing device provided by the present application is introduced as follows. The data processing device introduced below and the physical address mapping method and device and the data processing method described above can be cross-referenced.

Figure 9:
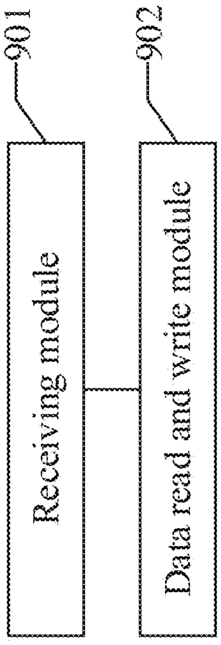
FIG. 9 is a schematic diagram of a data processing device disclosed in the present application.

As illustrated in FIG. 9, an embodiment of the present application discloses a data processing device, including: a receiving module 901 for receiving data read and write operations sent by a host to which the target hard disk belongs; and a data read and write module 902 for performing physical addressing in the target hard disk for the available PMA length obtained according to any of the above embodiments, performing the data read and write operations, and updating an L2P table in a memory of the host.

In an embodiment, the device further includes: an L2P table storage module for, when the host is powered off, obtaining a corresponding bus address of the L2P table in the memory and storing the L2P table in the target hard disk based on the bus address.

In an embodiment, the device further includes: an L2P table read module for, when the host is powered on, reading the L2P table in the target hard disk to a memory.

In an embodiment, the device further includes: an L2P table updating module for using a mutex when updating the L2P table to ensure that only a single process accesses the L2P table at a time.

In an embodiment, the L2P table updating module is further configured for: moving the updated data corresponding to any PMA to a memory area corresponding to a user process after all bits corresponding to the PMA in the L2P table are updated, so that the user process reads the updated data corresponding to the PMA from the memory area.

Here, for the more specific working processes of individual modules and units, please refer to the corresponding information disclosed in the above embodiments. They will not be repeated here.

It can be seen that this application provides a data processing device that can complete the data read and write operations in the target hard disk, update the L2P table in the memory of the host, provide a fast disk write mode for the L2P table with a large amount of data, solve the conflict between non-32-bit PMAs and 32-bit hardware operating atoms, and improve the read and write efficiency.

An electronic device provided by the present application is introduced below. The electronic device introduced below and any of the above embodiments can be cross-referenced.

Figure 10:
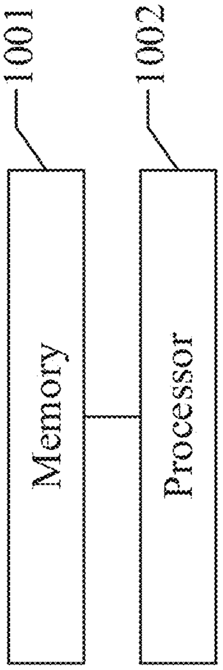
FIG. 10 is a schematic diagram of an electronic device disclosed in the present application.

As illustrated in FIG. 10, an embodiment of the present application discloses an electronic device, including: a memory 1001 for storing a computer program; and a processor 1002 for executing the computer program to implement the methods disclosed by any of the above embodiments.

The following describes a readable storage medium provided in an embodiment of the present application. A readable storage medium described below can be cross-referenced with any of the above embodiments.

A readable storage medium for storing a computer program, where the computer program implements the method disclosed in any of the above embodiments when executed by a processor. The specific steps of the method can refer to the corresponding content disclosed in the above embodiments, and will not be repeated here.

The terms "first," "second," "third," "fourth," etc., involved in this application (if any) are used to distinguish similar objects and are not necessarily used to describe a specific order or sequence. It should be understood that the data used in this way can be interchanged in appropriate circumstances so that the embodiments described herein can be implemented in a sequence other than those illustrated or described herein. In addition, the terms "comprising" and "having" and any modifications thereof are intended to cover non-exclusive inclusions. For example, a process, method, or device that includes a series of steps or units is not necessarily limited to those steps or units clearly listed, but may include other steps or units that are not clearly listed or inherent to these processes, methods, or devices.

It should be noted that the descriptions involving "first," "second," etc., in this application are only for descriptive purposes and cannot be understood as indicating or implying their relative importance or implying the number of technical features indicated. Therefore, the features limited to "first" and "second" can explicitly or implicitly include at least one of these features. In addition, the technical solutions between the various embodiments can be combined with each other, but they must be based on the ability of ordinary technicians in this field to achieve them. When the combination of technical solutions conflicts or cannot be achieved, it should be considered that the combination of such technical solutions does not exist and is not within the scope of protection required by this application.

The various embodiments in this application are described in a progressive manner, and each embodiment focuses on the differences from other embodiments. The same or similar parts between the various embodiments can be referred to each other.

The steps of a method or algorithm described in connection with embodiments disclosed herein may be implemented directly in hardware, a software module executed by a processor, or a combination of both. The software module may be placed in random access memory (RAM), memory, read only memory (ROM), electrically programmable ROM, electrically erasable programmable ROM, registers, target hard disk, removable disk, CD-ROM, or any other form of readable storage medium known in the art.

In this disclosure, specific examples are used to illustrate the principles and implementation methods of the present application. The above examples are only used to help understand the method and core ideas of the present application. At the same time, for those skilled in the art, according to the ideas of the present application, there will be changes in the specific implementation methods and application scope. In summary, the content of this disclosure should not be construed as limiting the present application.

The invention claimed is:

1. A physical address mapping method, comprising:
obtaining a target total capacity of a target hard disk;
determining a Physical Media Address (PMA) expansion length when an existing PMA length does not meet a physical addressing range of the target total capacity;
obtaining a first available PMA length that meets the physical addressing range according to the PMA expansion length and the existing PMA length;
adjusting the first available PMA length to obtain an optional PMA length;
calculating a first number of PMAs and a first remaining length included in a cache line of the target hard disk according to an available length of the cache line and the first available PMA length;
calculating a second number of PMAs and a second remaining length included in the cache line according to the available length of the cache line and the optional PMA length; and
using the optional PMA length as a second available PMA length that meets the physical addressing range when the first remaining length is greater than the second remaining length.

2. The physical address mapping method according to claim 1, wherein determining the PMA expansion length comprises:
determining a maximum total capacity that the existing PMA length meets; and
determining the PMA expansion length as X when the target total capacity is $2^X$ times of the maximum total capacity, wherein X is a positive integer.

3. A data processing method, comprising:
receiving data read and write operations sent by a host to which a target hard disk belongs;
performing physical addressing in the target hard disk for at least one available Physical Media Address (PMA) length;
performing the data read and write operations; and
updating a logical-to-physical (L2P) table in a memory of the host,
wherein the at least one available PMA length is obtained by performing operations comprising:
obtaining a target total capacity of the target hard disk;
determining a PMA expansion length when an existing PMA length does not meet a physical addressing range of the target total capacity;
obtaining a first available PMA length that meets the physical addressing range according to the PMA expansion length and the existing PMA length;
adjusting the first available PMA length to obtain an optional PMA length;
calculating a first number of PMAs and a first remaining length included in a cache line of the target hard disk according to an available length of the cache line and the first available PMA length;
calculating a second number of PMAs and a second remaining length included in the cache line according to the available length of the cache line and the optional PMA length; and
using the optional PMA length as a second available PMA length that meets the physical addressing range when the first remaining length is greater than the second remaining length, and
wherein the at least one available PMA length comprises at least one of the first available PMA length or the second first available PMA length.

4. The data processing method according to claim 3, wherein performing the physical addressing in the target hard disk for the at least one available PMA length comprises:
building the cache line based on the at least one available PMA length and performing physical addressing in the target hard disk based on the cache line.

5. The data processing method according to claim 4, wherein building the cache line based on the at least one available PMA length comprises:
determining PMAs of a target value included in the cache line according to the length of the cache line and the at least one available PMA length;
sequentially arranging the PMAs of the target value having the at least one available PMA length to build the cache line;
or
determining PMAs of the target value included in the cache line according to the length of the cache line and the at least one available PMA length, and calculating a difference D between the at least one available PMA length and 32-bit length; and
sequentially arranging first 32 bits of the PMAs of the target value, and arranging last D bits of the PMAs of the target value from a tail of the cache line to build the cache line.

6. The data processing method according to claim 3, further comprising:
using a mutex when updating the L2P table to ensure that only a single process accesses the L2P table at a time.

7. The data processing method according to claim 3, further comprising:
moving updated data corresponding to any PMA to a memory area corresponding to a user process after all bits corresponding to the PMA in the L2P table are updated, so that the user process reads the updated data corresponding to the PMA from the memory area.

8. An electronic device, comprising:

a memory storing a computer program; and a processor coupled to the memory, wherein the computer program, when executed by the processor, causes the processor to perform operations comprising:

obtaining a target total capacity of a target hard disk;

determining a Physical Media Address (PMA) expansion length when an existing PMA length does not meet a physical addressing range of the target total capacity;

obtaining a first available PMA length that meets the physical addressing range according to the PMA expansion length and the existing PMA length;

adjusting the first available PMA length to obtain an optional PMA length;

calculating a first number of PMAs and a first remaining length included in a cache line of the target hard disk according to an available length of the cache line and the first available PMA length;

calculating a second number of PMAs and a second remaining length included in the cache line according to the available length of the cache line and the optional PMA length; and using the optional PMA length as a second available PMA length that meets the physical addressing range when the first remaining length is greater than the second remaining length.

9. The electronic device according to claim 8, wherein determining the PMA expansion length comprises:

determining a maximum total capacity that the existing PMA length meets; and determining the PMA expansion length as X when the target total capacity is $2^X$ times of the maximum total capacity, wherein X is a positive integer.

10. The electronic device according to claim 8, wherein the operations further comprise:

receiving data read and write operations sent by a host to which the target hard disk belongs;

performing physical addressing in the target hard disk for at least one available PMA length, wherein the at least one available PMA length comprises at least one of the first available PMA length or the second first available PMA length;

performing the data read and write operations; and updating a logical-to-physical (L2P) table in a memory of the host.

11. The electronic device according to claim 10, wherein performing the physical addressing in the target hard disk for the at least one available PMA length comprises:

building the cache line based on the at least one available PMA length and performing physical addressing in the target hard disk based on the cache line.

12. The electronic device according to claim 11, wherein building the cache line based on the at least one available PMA length comprises:

determining PMAs of a target value included in the cache line according to the length of the cache line and the at least one available PMA length;

sequentially arranging the PMAs of the target value having the at least one available PMA length to build the cache line;

or determining PMAs of the target value included in the cache line according to the length of the cache line and the at least one available PMA length, and calculating a difference D between the at least one available PMA length and 32-bit length; and sequentially arranging first 32 bits of the PMAs of the target value, and arranging last D bits of the PMAs of the target value from a tail of the cache line to build the cache line.

13. The electronic device according to claim 10, wherein the operations further comprise:

using a mutex when updating the L2P table to ensure that only a single process accesses the L2P table at a time.

14. The electronic device according to claim 10, wherein the operations further comprise:

moving updated data corresponding to any PMA to a memory area corresponding to a user process after all bits corresponding to the PMA in the L2P table are updated, so that the user process reads the updated data corresponding to the PMA from the memory area.

* * * * *